(12) United States Patent
Banerjee et al.

(10) Patent No.: US 10,187,427 B2
(45) Date of Patent: *Jan. 22, 2019

(54) NETWORKING FLOW LOGS FOR MULTI-TENANT ENVIRONMENTS

(71) Applicant: Amazon Technologies, Inc., Seattle, WA (US)

(72) Inventors: Rajat Banerjee, Arlington, VA (US); Nathan Andrew Miller, Seattle, WA (US); Aniket Deepak Divecha, Seattle, WA (US); John Robert Kerl, Reston, VA (US); Mingxue Zhao, Seattle, WA (US); Shuai Ye, Herndon, VA (US); Kevin Christopher Miller, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/605,194

(22) Filed: May 25, 2017

(65) Prior Publication Data
US 2017/0359384 A1    Dec. 14, 2017

Related U.S. Application Data

(63) Continuation of application No. 14/673,516, filed on Mar. 30, 2015, now Pat. No. 9,667,656.

(51) Int. Cl.
*H04L 29/06* (2006.01)
*H04L 12/26* (2006.01)

(52) U.S. Cl.
CPC ............ *H04L 63/20* (2013.01); *H04L 43/067* (2013.01); *H04L 43/0876* (2013.01);
(Continued)

(58) Field of Classification Search
CPC ...................................................... H04L 63/20
See application file for complete search history.

(56) References Cited

U.S. PATENT DOCUMENTS 5,315,586 A    5/1994 Charvillat
6,243,451 B1   6/2001 Shah et al.
(Continued)

FOREIGN PATENT DOCUMENTS

| JP | H1132085 | 2/1999 |
| JP | 2004165761 | 6/2004 |
| JP | 2005293509 | 10/2005 |

OTHER PUBLICATIONS

International Search Report and Written Opinion dated Jun. 28, 2016, International Patent Application No. PCT/US2016/24789, filed Mar. 29, 2016.
(Continued)

*Primary Examiner* — Kambiz Zand
*Assistant Examiner* — Thanh Le
(74) *Attorney, Agent, or Firm* — Davis Wright Tremaine LLP

(57) ABSTRACT

Computing resource service providers may provide computing resources to customers in a multi-tenant environment. These computing resources may be behind a firewall or other security device such that certain information does not reach the computing resources provided to the customer. A logging entity may be implemented on computer server operated by the computing resource service provider. The logging entity may obtain log information from the firewall or other security device and store the log information such that it is accessible to the customer. Additionally, the log information may be provided to other services such as a metrics service or intrusion detection service.

20 Claims, 10 Drawing Sheets

(52) U.S. Cl.
CPC ...... *H04L 63/0227* (2013.01); *H04L 63/0245* (2013.01); *H04L 63/1408* (2013.01)

(56) References Cited

U.S. PATENT DOCUMENTS

| | | | |
|---|---|---|---|
| 7,020,696 B1 | 3/2006 | Perry et al. | |
| 7,266,595 B1 | 9/2007 | Black et al. | |
| 7,280,529 B1 | 10/2007 | Black et al. | |
| 8,595,843 B1* | 11/2013 | McCabe | H04L 69/24 709/223 |
| 2002/0120741 A1 | 8/2002 | Webb et al. | |
| 2003/0149888 A1 | 8/2003 | Yadav | |
| 2006/0028999 A1 | 2/2006 | Iakobashvili et al. | |
| 2006/0088004 A1 | 4/2006 | Casey et al. | |
| 2006/0089157 A1 | 4/2006 | Casey et al. | |
| 2007/0250930 A1 | 10/2007 | Aziz et al. | |
| 2008/0049638 A1 | 2/2008 | Ray et al. | |
| 2011/0078309 A1 | 3/2011 | Bloch et al. | |
| 2011/0149909 A1 | 6/2011 | An et al. | |
| 2014/0019972 A1 | 1/2014 | Yahalom et al. | |
| 2014/0173712 A1 | 6/2014 | Ferdinand et al. | |
| 2014/0280884 A1* | 9/2014 | Searle | H04L 43/0864 709/224 |
| 2014/0366118 A1 | 12/2014 | Yin | |
| 2014/0366138 A1* | 12/2014 | Zou | G06F 21/56 726/24 |
| 2015/0058917 A1* | 2/2015 | Xu | H04L 63/0272 726/1 |
| 2015/0067171 A1 | 3/2015 | Yum et al. | |

OTHER PUBLICATIONS

Australian First Examination Report for Patent Application No. 2016242813 dated Apr. 19, 2018, 3 pages.
Canadian Office Action for Patent Application No. 2,980,583 dated Jul. 30, 2018, 5 pages.
Singapore Notice of Eligibility for Grant and Supplementary Examination Report, dated Aug. 6, 2018, for Patent Application No. 11201707777Y, 5 pages.
Japanese Notice of Reasons for Refusal for Patent Application No. 2017-549418 dated Oct. 26, 2018, 7 pages.
Yuji et al., "Event Monitoring and Analysis for Compliance Automation in IaaS Public Cloud," Information Processing Society of Japan Technical Report, Mar. 2015, vol. 2015-DPS-162(2), retrieved from https://ipsj.ixsq.nii.ac.jp/ej/?action=repository_uri&item_id=113600&file_id=1&file_no=1, 14 pages.

\* cited by examiner

NETWORKING FLOW LOGS FOR MULTI-TENANT ENVIRONMENTS

CROSS REFERENCE TO RELATED APPLICATION

This application is a continuation of U.S. patent application Ser. No. 14/673,516, filed Mar. 30, 2015, now U.S. Pat. No. 9,667,656, entitled "NETWORKING FLOW LOGS FOR MULTI-TENANT ENVIRONMENTS," the disclosure of which is hereby incorporated herein in its entirety. This application also incorporates by reference for all purposes the full disclosure of co-pending U.S. patent application Ser. No. 14/665,683, filed Mar. 23, 2015, entitled "EVENT-DRIVEN FRAMEWORK FOR FILTERING AND PROCESSING NETWORK FLOWS."

BACKGROUND

In a large distributed computing system of a computing resource service provider, various customers, users, services, and resources of the computing resource service provider are in frequent communication with each other. Keeping the system secure becomes more challenging as applications are updated and as the complexity and usage of the system increases. In such distributed computing systems, it can be difficult to identify the vulnerabilities of the system. Furthermore, it can also be difficult to isolate and troubleshoot issues with the system, and even when issues are identified, reliably securing the system may be challenging. Additionally, many conventional systems rely upon manual mitigation of such vulnerabilities. The complexity and distribution of computing resources in these environments may make it difficult to collect and analyzes log information generated by the computing resources.

BRIEF DESCRIPTION OF THE DRAWINGS

Various embodiments in accordance with the present disclosure will be described with reference to the drawings, in which.

DETAILED DESCRIPTION

Figure 1:
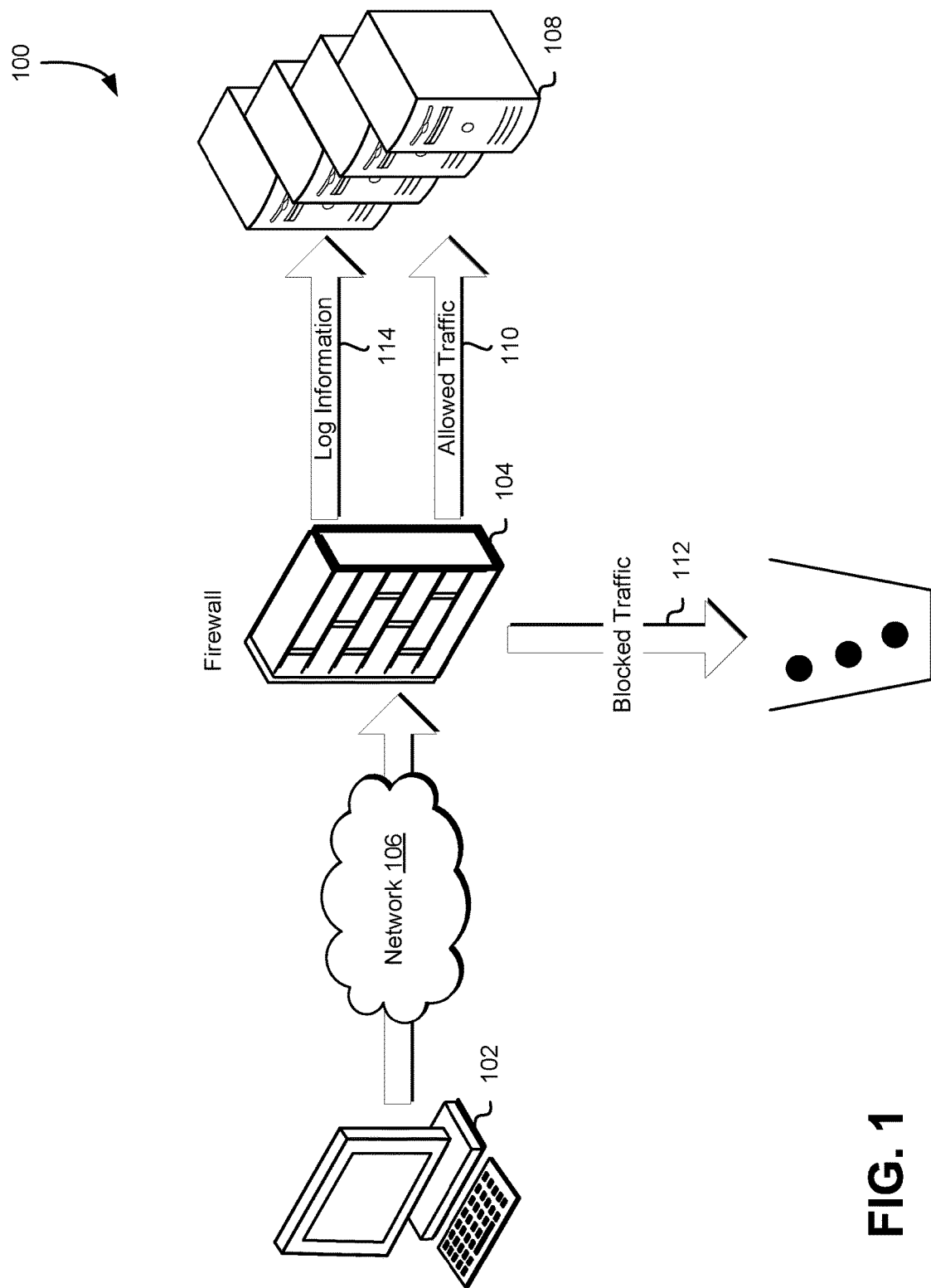
FIG. 1 illustrates an environment in which a computing resource service provider may provide customers with access to computer log information generated by computer systems operated by the computing resource service provider in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Techniques described and suggested herein relate to improvement in network logging and computer logging in multi-tenant computing resource service provider environments. A computing resource service provider may operate computing resources programmatically managed by the customer of the computing resource service provider. For example, the computing resource service provider may operate a virtual computer system service and an on-demand storage service, these services may provide computing resources to customers of the computing resource service provider. The customer may then remotely load software, configure, start, stop, and perform other operations in connections to the computer resources made accessible to the customer by the computing resource service provider. The computing resource service provider may leverage the computer systems implementing the services provided to the customers by allowing over-subscription of the computing resources. Furthermore, at least a portion of the computing resources provided to the customer may be virtualized. For example, the computing resource service provider may provide virtual computer systems to the customer, which that customer may use to implement various applications, such as a web server.

The computing resource service provider may also implement a firewall or other security features in order to protect customer information. As a result of these security features and the virtualized computing environment, network log information and other computer log information may not be accessible to the customer. The computing resource service provider may collect the log information on behalf of the customer, package the information, and provide the information to the customer. Additionally, the computing resource service provider may provide the log information to a destination indicated by the customer. For example, the computing resource service provider may provide the log information to a metrics service or intrusion detection service. The metrics service may generate visualizations, alerts, and on information corresponding to the log information on behalf of the customer. For example, the metrics service may provide the customer with current network load on the customer's virtual computer system instance. The intrusion detection service may use the log information to perform various attack mitigation and attack detection operations. Furthermore, the intrusion detection system may use the log information to update firewall settings, intrusion detection settings, and other security settings of various computing systems operated by the computing resource service provider. An intrusion prevention system may also use the log information to determine and apply a set of security policies. For example, the intrusion prevention system may limit the types of data that may be transmitted by or obtained from a customer virtual computer system instance.

The computing systems providing the computing resources to the customer may include a logging entity configured to obtain network log and computer log information corresponding to computing resources provided to particular customers. The logging entity may obtain log information directly from the computing system or a component of the computer system. For example, the computing system may include a firewall configured to block particular traffic directed to customer computer system instances. The logging entity may obtain network log information from the firewall and cause the log information to be persistently stored. The metrics service or some other service may determine information based at least in part on the log information stored by the logging entity. For example, the metrics service may determine an amount of traffic, a number of packets, or size of a particular network flow directed to a particular customer's computer system instance.

FIG. 1 illustrates an environment 100 in which a computing resource service provider may provide customers with access to computer log information 114 generated by computer systems operated by the computing resource service provider. The computing resource service provider may provide computing resources to customers 102. Furthermore, the customers 102 may request log information 114 from the computer resource service provider. A server computer system 108 may be configured to provide the computing resources to the customer 102. For example, the server computer system 108 may provide virtual computing capacity or storage capacity to the customer 102. The customer 102 and other entities may communicate with the server computer system 108 over a network 106. The network 106 may include a virtual private network, an intranet, the Internet, a cellular network, a local area network, a satellite network or any other such network and/or combination thereof.

Additionally, the sever computer system 108 may implement a firewall 104 to permit or deny communications based at least in part on a security policy. In some examples, this firewall may block one or more ports of the target computing system or target virtual computer system instance unless those ports are specifically "opened." In other words, data packets received at the server computer system 108 specifying the blocked 112 (i.e., unopened) ports may be ignored or may cause an error code to be sent to the source of the packets. If the traffic does not violate the security policies the traffic may be allowed 110 by the firewall 104 to reach the customers 102 computer system instances.

The server computer system 108 may organize computing resources assigned to customers in to resource groups such as firewalls, scaling groups and/or other such groups. One or more resources may be associated with and/or placed in resource groups indicating one or more resource groupings and/or one or more resource dependencies. Resource groups may be nested so that, for example, a scaling group may include one or more firewalls which may include one or more resources and/or may include one or more other resource groups. As used herein, the term firewall 104 may refer to hardware, software, or combination thereof configured to control inbound and outbound network traffic based at least in part on a policy. The firewall 104 may be configured to ensure this security by, for example, examining network traffic to verify that incoming and/or outgoing data packets conform to one or more security policies. The firewall 104 may further be configured to verify credentials of connections to resources, may be configured to validate those credentials using one or more policy services or perform combinations of these and/or other security-related functions. The firewall 104 may be implemented as hardware, software, firmware, a virtual device, or as a combination of these and/or other such implementation methods.

Furthermore, the server computer system 108 may include a logging entity (described in greater detail below) communicatively coupled to the firewall 104 such that the logging entity may obtain log information 114 from the firewall 104 and store the information using computing resources of the server computer system 108. The customer 102 or other entity may then access the log information 114 stored by the server computer system 108. The log information 114, as described in greater detail below, may include information corresponding to the customer, network interface, number of packets transmitted for a particular network flow, number of bytes for a particular network flow, source address, destination address, source port, destination port, action performed by the firewall 104, protocol associated with a particular network flow, an application associated with a particular flow, and other information logged by the server computer system 108. In various embodiments, a customer may cause the logging entity or other component of the server computer system 108 to filter the log information based at least in part on one or more attributes of the log information. For example, the customer may, through a management console described in greater detail below in connection with FIG. 3, cause the log information to be filtered such that the log information includes only log entries corresponding to network packets and/or network flows denied or blocked by the firewall 104. In yet another example, the customer may request filtered log information from a metrics service (described in greater detail below), the metrics service may then filter the log information obtained from the logging entity for the information requested by the customer.

Figure 2:
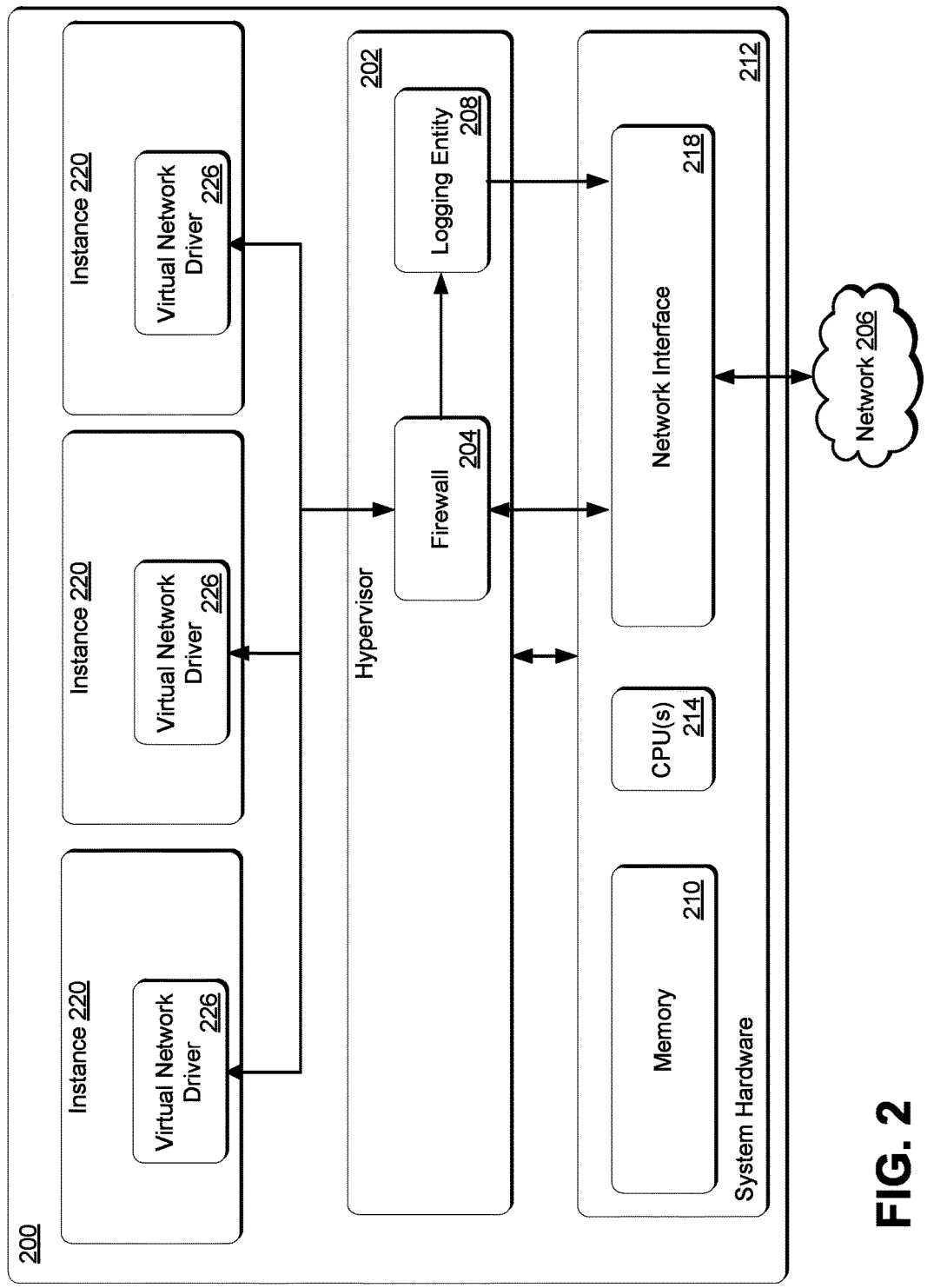
FIG. 2 is an illustrative, simplified block diagram of a server computer system that may be used to collect computer log information generated by computer systems operated by the computing resource service provider in accordance with an embodiment.

FIG. 2 is an illustrative, simplified block diagram of a server computer system 200 that may be used to practice at least one embodiment of the present disclosure. The server computer system 200 may contain system hardware 212, the system hardware 212 may be used to support the execution of a variety of applications. The system hardware 212 may include memory 210, one or more central processing units (CPUs) 214, and a network interface 218. The system hardware 212 may include other hardware devices not shown in FIG. 2 for simplicity, the other hardware device may store devices, graphics devices, input output (I/O) controller or any other hardware device suitable for supporting the execution of one or more hypervisors 202 or other applications. The one or more central processing units 214 (also referred to as processors for simplicity) may be communicatively coupled to a number of systems or hardware devices, such as the memory 210, and the network interface 218. The server computer system 200 may also include several applications, including a network interface 218 and a computer system instance 220, which may include as illustrated in FIG. 2 a virtual network driver 226. The virtual network driver 226 may provide a network interface for the customer computer system instances 220.

The hypervisor 202 may be a set of computer executable instructions, that when executed by one or more processors of the server computer system 200, causes the system to provide a virtual operating platform and manage access to the system hardware 212. Furthermore, the hypervisor 202 may provide support for computer system instance 220. Computer system instances 220 may be a virtual computer system configured to execute one or more applications implemented by the customer. For example, the computer system instance 220 may execute a web server operated by the customer. The computer system instance 220 may also be communicatively coupled to the hypervisor 202 to enable hypervisor management commands received from the customer to be transmitted to the hypervisor 202.

The memory 210 may provide a computer-readable storage medium for storing data that may provide the functionality of at least one embodiment of the present disclosure. The data stored in the memory 210 (programs, code modules, instructions) that, when executed by one or more central processing units 214, may provide the functionality of one or more embodiments of the present disclosure. These application modules or instructions may be executed by the one or more central processing units 214. The network interface 218 may be network interfaces connected to the computing system 200. The network interface 218 may be a hardware, software, or combination thereof configured to receive and transmit application data, such as computer system instance 220, over a network 206 to one or more other computing systems. Although only one enhanced network interface 218 is shown in FIG. 2, multiple network interfaces 218 may be connected to computing system 200 in accordance with the present disclosure. The network interfaces 218 may be configured to send and receive application data through the virtual network driver 226 included in the computer system instance 220.

The server computer system 200 may also include a firewall 204. The firewall 204 may be configured to permit or block network traffic based at least in part on one or more security policies provided by the customer or computing resource service provider. The firewall 204 may be implemented as hardware, software, or a combination thereof. For example, the firewall 204 may include a kernel module configured to filter network traffic directed to computer system instances 220 implemented by the server computer system 200. In addition, the server computer system may include a logging entity 208 configured to obtain log information from the firewall 204.

The logging entity 208 allows customers to obtain log information regarding network traffic flows to and from the virtual network driver 226 of the server computer systems 200. The log information captured by the logging entity 208 includes customer identification information, virtual network driver identification information, packet count, byte count, timestamp corresponding to the start of the network flow, timestamp corresponding to the end of the network flow, and an action performed by the firewall 204. The logging entity 208 can publish the log information to a storage device, computing service, or server computer system. For example, the logging entity may be configured to publish the log information to a metrics service described in greater detail below. Additionally, the logs may be published at various intervals of time or may be streamed directly to the receiving party as the logs are generated. For example, streaming the log information to an intrusion detection system may enable real-time or near real-time attack mitigation.

The network log information may enable the customer to troubleshoot various customer networks. The customer networks may include resources provided by the computing resource service provider as well as computing resources operated by the customer, for example, on premise computing resources. In a specific troubleshooting example, a least some network traffic may not be reaching the customer's computer instances provided by the computing resource service provider. The network log information may include information corresponding to denied network traffic to the customer's computer instance, enabling the customer to see that a firewall or other device may be blocking inbound traffic to the customer's computer instance. Alternatively, the network log information may indicate to the customer that the source traffic from another computer instance is being blocked and is not reaching the filters on a second computer instance.

The network log information may also be used in connection with intrusion detection and mitigation systems. For example, if the customer's computer instance has been compromised the network log information may indicate that the customer's computer instance is performing port scans of other network interfaces of computer instances in the customer's virtual private network, or port scans against Internet hosts, or the computer instance is transmitting files to an Internet host. Additionally, the network log information may indicate a potential attack that might be mounting. For example, the network log information may include denied SSH traffic going to multiple computer instances operated by the customer, the customer may then take specific countermeasures as per the customer's corporate policy.

The network logging information may be provided to a metrics service. The metrics service, described in greater detail below, may provide various visualizations to the customer such as accepted traffic to the customer instances, traffic patterns to the customer's instances, and other visualizations. The network log information may also include information corresponding to specific user sessions or IP sessions. In addition to metrics services, the network log information may be used for network analysis. The analysis and/or metrics service may also include alarms configured to transmit notifications to customers in response to detected events or attributes, for example, if the network traffic to the customer's computer instance is above a threshold for an interval of time or the customer's computer instance is receiving no network traffic for an interval of time.

Network log information may include a variety of different elements including format version, customer account identification information, network interface identification information on which the flow is captured, source address of the flow, destination address of the flow, source port of the flow, destination port of the flow, protocol in use by the flow, calculated number of packets seen in the flow during a sampling window, a number of bytes seen in the flow during the sampling window, start of the sampling period for which flow is detected, end of the sampling period for which flow is detected, and an action associated with the flow. The action may include a variety of actions taken by the firewall or other device implements by the computing resource service provider such as accept, deny, or no data.

Figure 3:
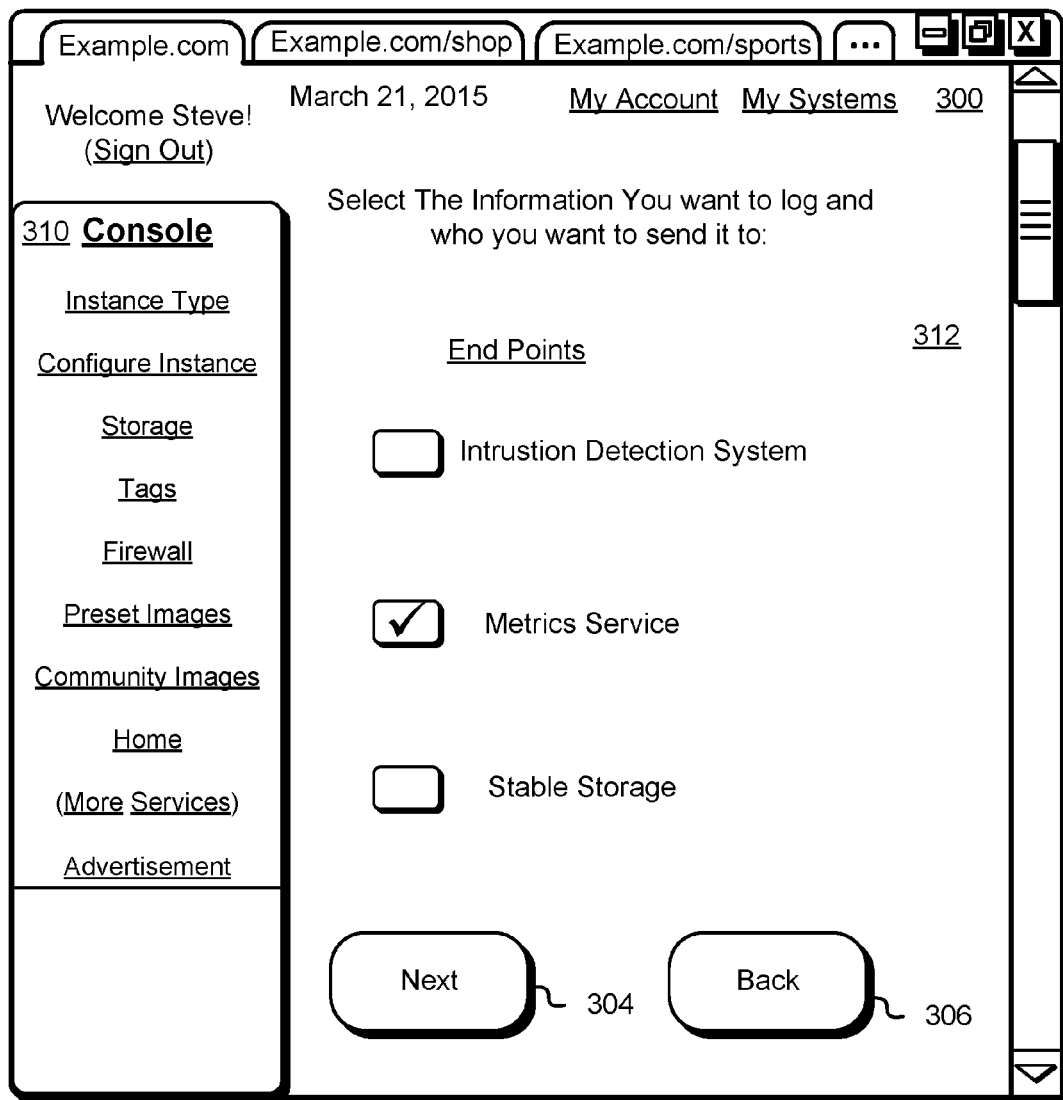
FIG. 3 illustrates a webpage which may be displayed by an application executed by a computing device enabling a user to interact with a network logging service operated by a computing resource service provider in accordance with an embodiment.

FIG. 3 shows a webpage 300 which may be displayed by an application executed by a computing device enabling a user to interact with a network logging service operated by a computing resource service provider. The webpage 300 provides the user the ability to select a variety of options 312 for controlling providing network log and/or computer log information to an end point. Network log information may include information corresponding to any transfer of some amount of data between two endpoints (such as a pair of applications or a pair of modules of the same application, typically running on different physical hosts) in accordance with one or more networking protocols. It is noted that although, for ease of explanation, much of the following description refers to a source and a destination for a given network transmission, either direction for a bi-directional transmission between the two endpoints involved in the transmission may each be considered either a source or a destination for different subsets of the bi-directional traffic. The computer log information may include any information records by a computer system corresponding to the operation of the computer system, such as actions taken, error codes, or the result of an operation.

As illustrated in FIG. 3, the webpage 300 includes various graphical user interface elements that enable customers to provision, manage, and interact with computer instances through a management console of which the webpage 300 is a part. The webpage 300 may be displayed by various applications, such as a mobile application or a web browser. In this example, the webpage 300 includes various navigational features. For instance, on the left-hand side of the webpage 300, various links 310 may link to one or more other webpages that contain additional content corresponding to a variety of different actions the customer may cause to be performed. The console pages may correspond to operations that may be taken to manage or otherwise control virtual machine instances by the virtual machine management service described in greater detail below. In this example, the links appear as textual words which enable the links to be selected using an appropriate input device such as a keyboard, mouse, touchscreen, or other input device. Selection of one of the links 310 may cause an application displaying the webpage 300 to submit, pursuant to a URL associated with the selected link by the programming of the webpage 300, an HTTP request for the content associated with the link to a server that provided the webpage 300 or another server.

In this example, the webpage 300 also includes a graphical user element configured as a "next" button 304. The next button 304 may be a graphical user interface element of the webpage 300 where the underlying code of the webpage 300 is configured such that selection by an input device of the next button 304 causes information corresponding to the selection of an endpoint for the network log information and/or computer log information on the webpage 300 to be transmitted to one or more server computer systems of the computing resource service provider, such as the server computer systems responsible for executing the virtual machine management service. Through the management console, the customer may be guided through the process of setting up logging for a particular computer system instance. The process may be divided into steps and the customer may be prompted to provide information at each step. For example, the webpage 300 displays to the customer a list of different types of log information that may be collected. The customer, using an input device, may select various attributes of the computer instance and/or networking environment of the computer instance. The customer selection may be stored until the entire process is completed or the customer selection may be transmitted to the virtual machine management service upon selection of the next button 304. Although end point for log information selection is shown in FIG. 3, the customer may be prompted to select any operating parameters and/or software application to be executed by the computer instance once instantiated.

In various embodiments, the service provider may determine the particular type of virtualization layer for the user based at least in part on various factors such as type of log information selected by the user, quantity of log information selected by the user, operating system selected by the user, features of the operating system selected by the user, particular features selected by the user, applications selected by the user, availability of particular virtualization layer, cost associated with a particular virtualization layer, or other factors suitable for selecting virtualization layers based on user information. In these embodiments, the user may or may not be presented with the ability to select a particular virtualization layer but may be presented with a selection of whether to enable logging of network transmission to and/or from the user's computer system instance. If the user selects to enable or disable logging, the user may be presented with the option to select between the user-selection and the service-provider-determined selection.

The webpage 300 may also include a graphical user element configured as a "back" button 306. The back button 306 may be a graphical user interface element of the webpage 300 where the underlying code of the webpage 300 causes the application displaying the webpage 300 to navigate to a previously navigated webpage. Once the customer has made a selection using the webpage 300 and selected the next button 304, the application displaying the webpage 300 may submit an HTTP request for provision or modification of a computer system instance supported by a virtualization layer configured to enable or disable logging for the computer system instance. The request may be transmitted to one or more server computer systems or services of the computing resource service provider. For example, the request may be transmitted to the virtual machine management service operated by the computing resource service provider. The virtual machine management service may then select, based at least in part on the customer selection, a physical host (e.g., server computer system) capable of performing the selected network logging or computer logging information and cause the physical host to instantiate a computer system instance on behalf of the user. At some point in time after the computer system instance is instantiated, the virtual machine management service may pass operation of the virtual machine to the user. The virtual machine management service or some other service of the computing resource service provider may select the physical host based at least in part on a variety of factors beyond the logging options selected by the user, including a particular geographic area based at least in part on an Internet Protocol (IP) address associated with the request and the user, load on one or more physical hosts, network traffic associated with the one or more physical hosts, request response latency of the one or more physical hosts or any other information suitable for selecting a physical hosts to instantiate one or more computer instances.

Figure 4:
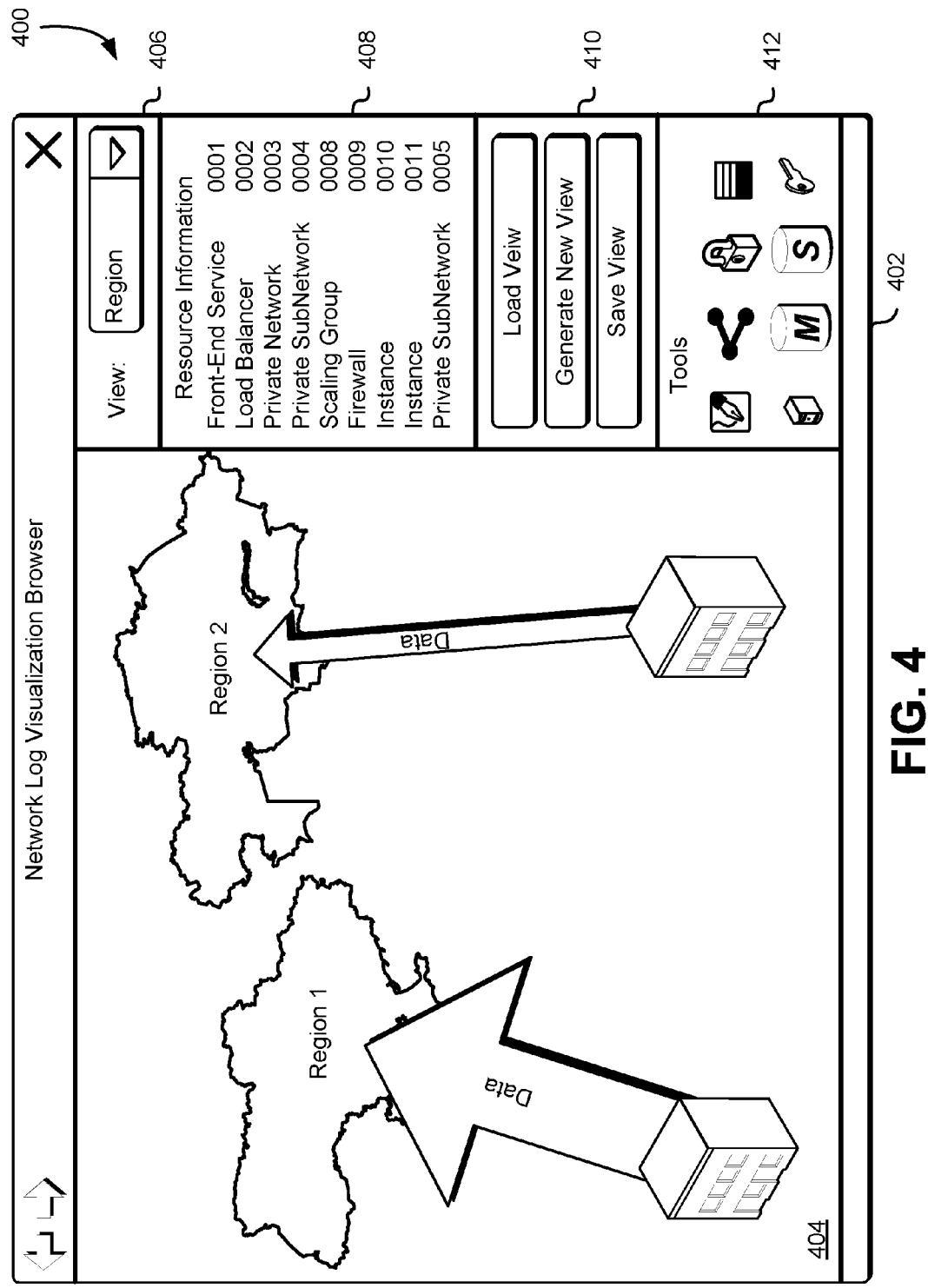
FIG. 4 illustrates an example environment where a network log visualization browser may be used to display network flow diagrams in accordance with an embodiment.

FIG. 4 illustrates an example environment 400 where a network log visualization browser may be used to display network flow diagrams as described herein at least in connection with FIGS. 1 and 2 and in accordance with at least one embodiment. A network log visualization browser 402 may be configured to produce network flow visualization diagrams using network log information as described herein above, save network flow diagrams, load network flow diagrams, apply filtering and/or analysis processes to network flow diagrams and/or perform other such processes associated with network flow visualization. The network log visualization browser 402 may be configured as a computer service such as a web service and may be provided as a service by the computing resource service provider as described herein at least in connection with FIG. 1.

The network log visualization browser 402 may include functionality 410 to perform operations such as loading network flow information, generating network flow visualizations, saving network flow visualizations and/or other such functionality. Network log information may be saved in a network log repository, a data store or some other such location. Network flow visualizations may also be saved in a repository, data store or some other such location. The network log visualization browser 402 may include functionality 408 to display at least a subset of the network log information and may also include functionality to display the filtered results of the network log as a result of applying one or more filtering processes 406. The filtering processes 406 may be based at least in part on one or more tags as described herein above.

The network log visualization browser 402 may further be configured to produce a network flow diagram 404 based at least in part on the network log information and/or based at least in part on the filtered network log information. The network flow diagram 404 may be displayed using block diagrams, generated images, or visualization elements and may, in some embodiments, include one or more icons. The network log visualization browser 402 may include a set of tools 412 used to perform various functionality in connection with the displayed network flow diagram 404. The set of tools 412 may be a set of functions included in the network log visualization browser 402 that enables the customer to perform a variety of operations such as analyzing the network flow diagram 404 or altering the network flow diagram 404.

As illustrated in FIG. 4, the network flow diagram 404 may be based at least in part on the topology of a customer's computer system instance and may include relationships (such as arrows) indicating connections and/or dependencies between the resources, resource groups, or networks represented by the blocks and/or icons and various regions. In the example illustrated in FIG. 4 the arrows indicating connections may also indicate an amount of network traffic transmitted from the customer's computer system instances for various regions. The regions may be geographic regions or may be networks or other groups of computing resources. In various embodiments, the network flow diagram 404 additionally includes text elements displaying, for example, tags associated with resource types, tags associated with resource instances, tags associated with resource groups, tags associated with networks or combinations of these and/or other such tags. The network flow diagram 404 may additionally include text elements displaying other data and/or metadata associated with the resources, the resource groups, the networks, the structured description and/or the computer system. In some embodiments, the network log visualization browser 402 may include functionality to update (or refresh) the network flow diagram 404 and may, in some embodiments, include functionality to provide settings relating to that update. For example, the network flow diagram 404 may be updated automatically once additional network log information is generated by the server computer system implementing the customer computer system instances.

As may be contemplated, the contents of the network log visualization browser 402 illustrated herein relating to browser functionality, display modalities, the presence and type of text elements, the presence and type of icon elements and/or other such user interface elements described herein in connection with the network log visualization browser 402 are merely illustrative examples indicating an embodiment of the network log visualization browser 402. As such, other types of browser functionality, display modalities, presence and type of text elements, presence and type of icon elements and/or other such user interface elements may be considered as within the scope of the present disclosure.

Figure 5:
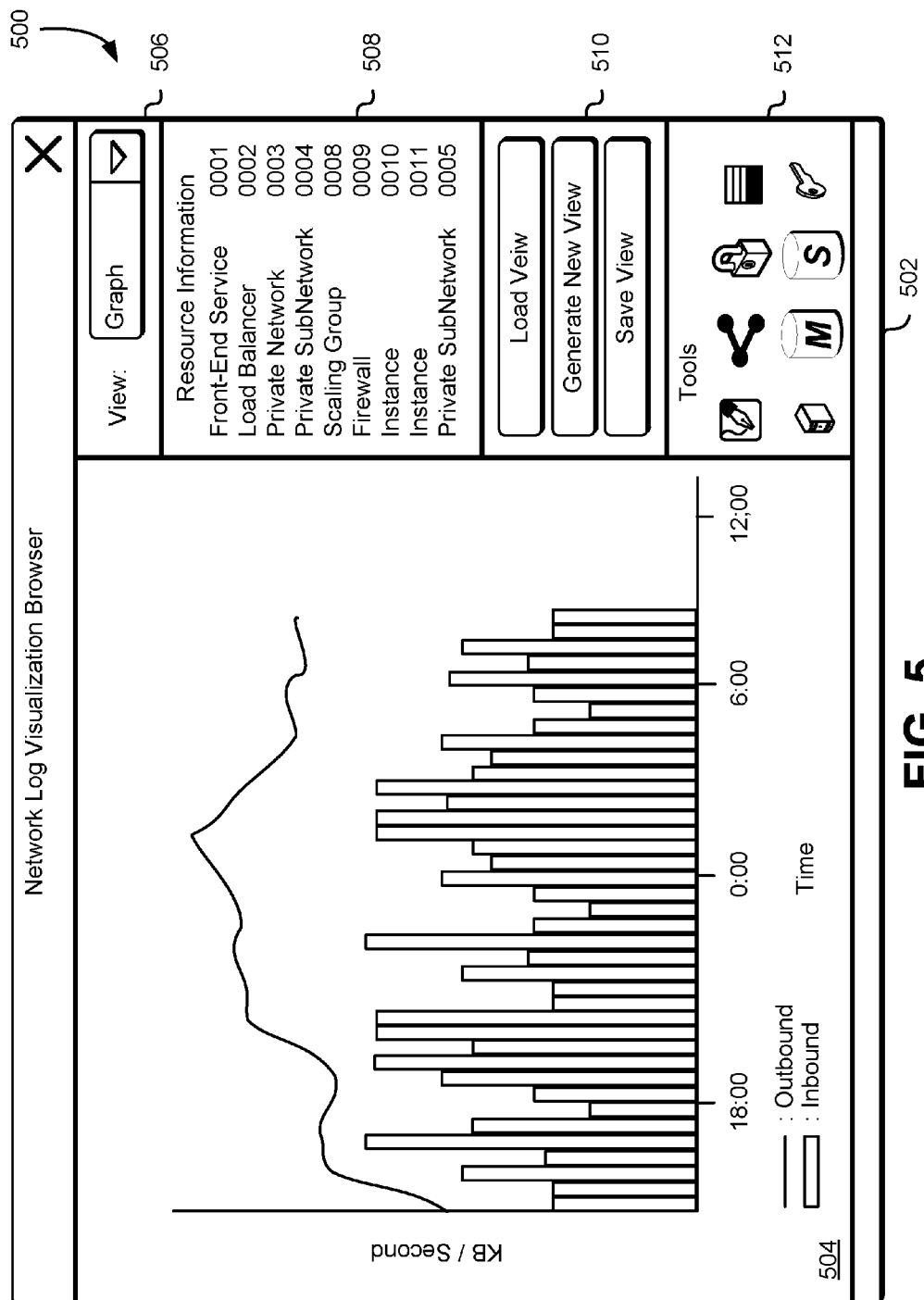
FIG. 5 illustrates an example environment where a network log visualization browser may be used to display network flow diagrams in accordance with an embodiment.

FIG. 5 illustrates an example environment 500 where a network log visualization browser may be used to display network flow diagrams as described herein at least in connection with FIGS. 1 and 2 and in accordance with at least one embodiment. A network log visualization browser 502 may be configured to produce network flow visualization diagrams using network log information as described herein above, save network flow diagrams, load network flow diagrams, apply filtering and/or analysis processes to network flow diagrams and/or perform other such processes associated with network flow visualization. The network log visualization browser 502 may be configured as a computer service such as a web service and may be provided as a service by the computing resource service provider as described herein at least in connection with FIG. 1.

The network log visualization browser 502 may include functionality 510 to perform operations such as loading network flow information, generating network flow visualizations, saving network flow visualizations and/or other such functionality. Network log information may be saved in a network log repository, a data store or some other such location. Network flow visualizations may also be saved in a repository, data store or some other such location. The network log visualization browser 502 may include functionality 508 to display at least a subset of the network log information and may also include functionality to display the filtered results of the network log as a result of applying one or more filtering processes 506. The filtering processes 506 may be based at least in part on one or more tags as described herein above.

The network log visualization browser 502 may further be configured to produce a network flow diagram 504 based at least in part on the network log information and/or based at least in part on the filtered network log information. The network flow diagram 504 may be displayed using block diagrams, generated images, or visualization elements and may, in some embodiments, include one or more icons. The network log visualization browser 502 may include a set of tools 512 used to perform various functionality in connection with the displayed network flow diagram 504. The set of tools 512 may be a set of functions included in the network log visualization browser 502 that enables the customer to perform a variety of operations such as analyzing the network flow diagram 504 or altering the network flow diagram 504.

As illustrated in FIG. 5, the network flow diagram 504 may be based at least in part on the amount of network traffic transmitted from and received at the customer's computer system instances. The network log visualization browser 502 may generate one or more graphs to include in the network flow diagram indicating an amount of network traffic transmitted to and from the customer's computer system instances for various intervals of time. In various embodiments, the network flow diagram 504 additionally includes text elements displaying, for example, tags associated with resource types, tags associated with resource instances, tags associated with resource groups, tags associated with networks or combinations of these and/or other such tags. The network flow diagram 504 may additionally include text elements displaying other data and/or metadata associated with the resources, the resource groups, the networks, the structured description and/or the computer system. In some embodiments, the network log visualization browser 502 may include functionality to update (or refresh) the network flow diagram 504 and may, in some embodiments, include functionality to provide settings relating to that update. For example, the network flow diagram 504 may be updated automatically once additional network log information is generated by the server computer system implementing the customer computer system instances.

As may be contemplated, the contents of the network log visualization browser 502 illustrated herein relating to browser functionality, display modalities, the presence and type of text elements, the presence and type of icon elements and/or other such user interface elements described herein in connection with the network log visualization browser 502 are merely illustrative examples indicating an embodiment of the network log visualization browser 502. As such, other types of browser functionality, display modalities, presence and type of text elements, presence and type of icon elements and/or other such user interface elements may be considered as within the scope of the present disclosure.

Figure 6:
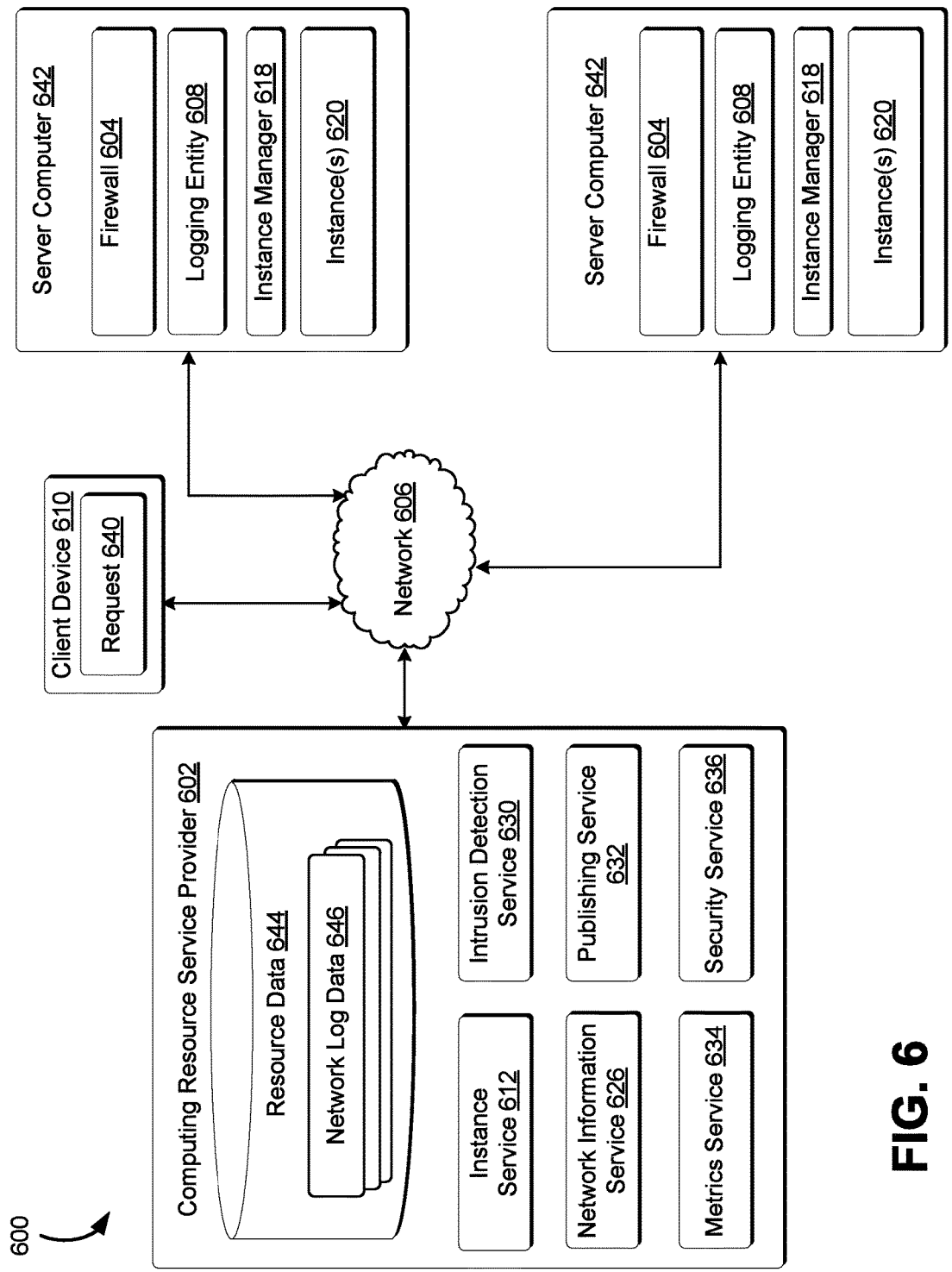
FIG. 6 illustrates an environment which includes a computing resource service provider in data communication with a client device and server computers over a network in accordance with an embodiment.

The environment such as that illustrated in FIG. 2 may be useful for a provider such as a computing resource provider, wherein the computing resource system responds to requests from customers to perform various logging functions in connection with a multi-tenant environment. As discussed above, the computing resource service provider provides a mechanism to allow customers to obtain network log information and computer log information associated with the customer's computer system instances. The environment in such a case may include additional components and/or other arrangements, such as those illustrated in the environment 600 of FIG. 6. In this example, the environment 600 includes a computing resource service provider 602 in data communication with a client device 610 and server computer systems 642 over a network 606. In one embodiment, the server computer systems 642 may be one or more computer hardware devices that are used to implement computer system instances 620, as described above in connection with FIG. 2. For example, the server computer systems 642 may include hardware for implementing types of computing resources, such as storage devices, virtualized storage devices, networking devices, and the like. Additionally, the implemented computing resources may be programmatically and remotely managed by a customer of the distributed computing resource provider.

The server computer systems 642 include a plurality of computer system devices that are each capable of executing one or more instances 620 created by the distributed computing resource service provider 602. In one embodiment, each of the server computer systems 642 includes a processor, a data store, an input/output bus, and/or any other component known in the art for executing instances 620. Additionally, the instances 620 may be virtual machine instances. As known in the art, a virtual machine instance is an instance of a software implementation on a machine (i.e., a computer) that executes programs like a physical machine. For example, each of the server computer systems 642 may be configured to execute an instance manager 618 capable of implementing the instances 620.

The instance manager 618 may be a hypervisor, virtualization layer, or another type of program configured to enable the execution of multiple instances 620 on a single server computer system 642, for example. As discussed above, each of the instances 620 may be configured to execute all or a portion of an application. Additionally, the network 606 may be similar to the network as described above. The networked environment 600 may span one or more data centers, where each data center may be geographically distinct from each other. Additionally, the networked environment 600 shown in FIG. 6 may be one of several embodiments employed by the computing resource service provider. The server computer systems 642 may further include a firewall 604 and a logging entity 608. The firewall 604 may be hardware, software, or combination thereof configured to manage network traffic to the instances 620 as described above. Furthermore, the logging entity 608 may be a set of computer executable instructions, that when executed by one or more processors of the sever computer systems 642, cause the sever computer systems 642 to obtain log information from the firewall 604 and/or the instance manager 618. For example, the logging entity 608 may obtain network log information from the firewall 604 and computer log information from the instance manger 618.

In one embodiment, the computing resource service provider 602 includes a data store containing resource data 644, an instance service 612, a network information service 626, an intrusion detection service 630, a publishing service 632, a metrics service 634, a security service 636, and/or other components. The resource data 644 may include data related to the server computer systems 642. For example, in one embodiment, the resource data 644 includes one or more records of network log data 646. Each one of the records of the network log data 646 corresponds to the server computer systems 642 of the networked environment 600.

The instance service 612 instantiates instances 620 based at least in part on a set of preferences provided by the customer. In one embodiment, the instance service 612 receives, from the customer on the client device 610, a request 640 to create one or more instances 620 and optionally assign the logging entity 608 to log information corresponding to the operation of the instances 620. Additionally, the request 640 received from the customer operating the client device 610 may also indicate a time to start execution of the requested instances 620. In response to receiving the request, the instance service 612 instantiates instances 620. In various embodiments, the intrusion service 630 or metrics service 634 receives the request 640 and transmits a command to the instance service 612 to begin logging information associated with the instances 620 and store the log data in the resource data 644 data store, such as network log data 646.

The customer may interact with the computing resource service provider 602 (via appropriately configured and authenticated API calls) to create, delete, and describe log information collected from instances 620 that are instantiated on server computer systems 642 and operated by the computing resource service provider 602. Additionally, the customer may create one or more security groups using the security service 636, the security groups may be a logical collection of instances 620 that are governed by the same set of security policies applied by the firewall 604. The customer may provide the set of security policies or the computing resource service provider 602 may define a minimum set of security policies. In various embodiments, the customer may create and manage security groups through a management console provided by the computing resource service provider 602. The management console may be exposed to the customers as a webpage, such as the webpage illustrated above in connection with FIG. 3, by interacting with the webpage (e.g., through a browser application) the customer may cause API calls to be generated. The generated API calls may cause the computing resource service provider 602 or component thereof to perform various operations indicated by the customer.

The intrusion detection service 630 may include a collection of devices and/or software applications that monitor network 606 and/or server computer system 642 activity for malicious activities or policy violations. Furthermore, the logging entity 608 or the publishing service 632 may provide the intrusion detection service 630 with network log data 646. Furthermore, the intrusion detection service 630 may correlate network log data 646 across various instances 620 operated by different customers. Correlating the network log data 646 may enable the intrusion detection service 630 to obtain additional information corresponding to an attack or attacker. For example, the log may indicate that a source IP address is scanning a particular network for opened ports. This activity may indicate the source IP address is involved in an attack and the intrusion detection system may cause data packets transmitted from the source IP address to be blocked. In various embodiments, the intrusion detection service 630 generates updates to the set of security polices managed by the security service 636 and provides the updated set of policies to the firewall 604 or other computing devices operated by the computing resource service provider 602. In addition to the intrusion detection service 630, the computing resource service provider may operate an intrusion prevention service (not illustrated in FIG. 6 for simplicity). The intrusion prevention service may include one or more network devices configured to prevent and/or block intrusions that are detected. For example, the intrusion prevention service may send an alarm, drop malicious packets, reset a connection, or block the traffic from the offending IP address. The intrusion prevention system may monitor network traffic by at least obtaining the network log data 646 from the logging entity 608 or the publishing service 632.

The network information service 626 may maintain customer account information and other information corresponding to the customer. For example, the network information service 626 may include customer identification information, instance identification information, network interface identification information, and other information suitable for identifying information associated with a particular customer. For example, as described above, the network log information may include customer identification information. The logging entity 608 or metrics service 634 may obtain the customer identification information from the network information service 626. The publishing service 632 publishes and schedules updates to the network log data 646 to the resources data 644 or other end point designated by the customer. The publishing service 632 may also periodically or aperiodically check if the logging entity 608 has additional log information to be published to one or more end points. In various embodiments, the publishing service 632 may transmit log information real-time or near real-time to the various end points.

The metrics service 634 may receive, from the logging entity 608 or other component of the server computer system 642, resource data 644 corresponding to the instances 620. The resource data 644 obtained by the metrics service 634 may indicate the utilization of various components of the instances 620 such as the central processing unit, memory, networking interface, operating system, applications, and other components of the instances 620. This information may be used for a variety of different purposes, for example, determining whether to allocate or deallocate resources to the auto-scaling group. Additionally, the information may be used by the metrics service 634 to determine the health of an instance 620 and/or a server computer system 642. The metrics service 634 may obtain and aggregate utilization information for all of the instances 620 assigned to the auto-scaling group. Furthermore, when instances 620 are placed in standby or detached from the auto-scaling group, the metrics service 634 may receive a command to remove the instances 620 from the set of instances 620 for which the metrics service 634 collects and/or aggregates utilization information for.

Figure 7:
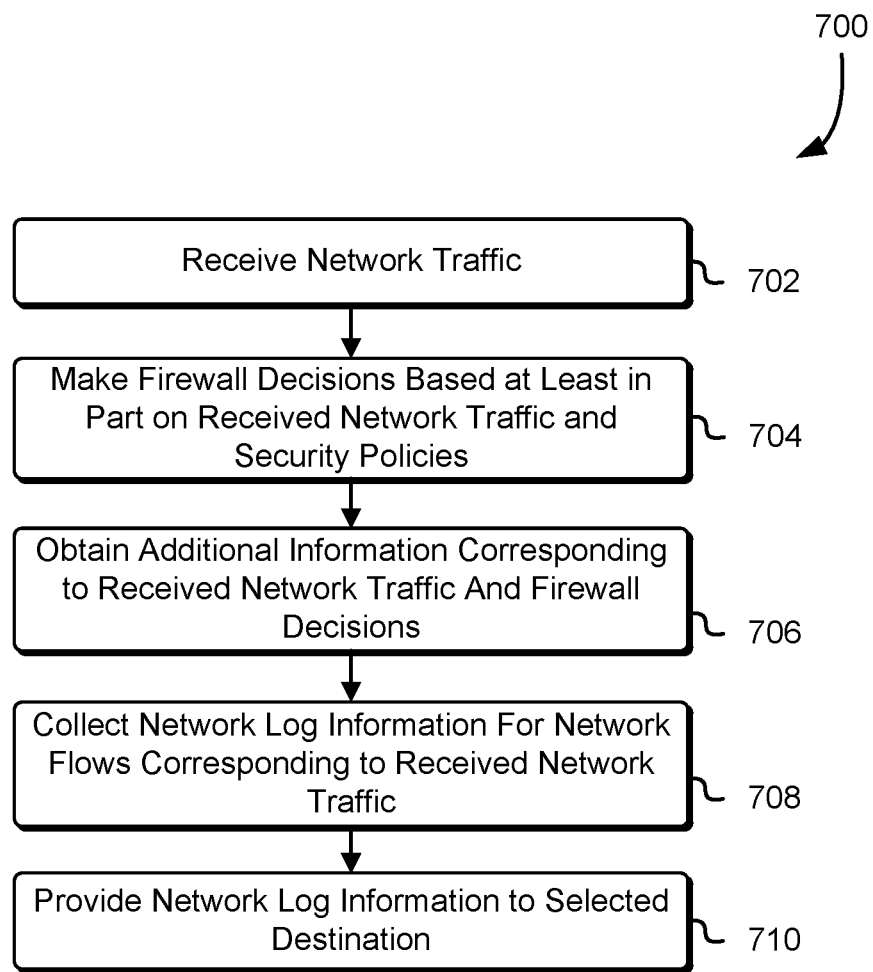
FIG. 7 is an illustrative process which may be used to provide log information corresponding to a computer system instance in a multi-tenant environment in accordance with an one embodiment.

FIG. 7 shows an illustrative process 700 which may be used to provide log information corresponding to a computer system instance in a multi-tenant environment in accordance with at least one embodiment. The process 700 may be performed by any suitable system such as the firewall and logging entity described above in FIGS. 1 and 2 or any combination of systems or component thereof. Returning to FIG. 7, in an embodiment, the process 700 includes receiving network traffic 702. The received network traffic may comprise one or more network flows or transmissions directed to a computer system instance operated by a customer and implemented using computing resources provided by a computing resource service provider. The traffic may be received, as described above, at a server computer system of the computing resource service provider. A firewall of the server computer system may then make a firewall decision based at least in part on the received network traffic and a set of security policies 704. The set of security policies may correspond to a set of network traffic which may be allowed by the firewall on a particular set of ports as described above. The firewall may take an action on the received traffic such as allow or deny.

Returning to FIG. 7, the process 700 may further include obtaining additional information corresponding to the received network traffic and firewall decisions 706. For example, the logging entity may obtain network interface identification information and the particular firewall decision corresponding to a particular network flow or network data packet. The logging entity may then collect network log information for network flows that correspond to the received network traffic 708. As described above, the network log information may include information obtained from the network data packet such as source address, size, protocol, and any other information included in the network data packet. The logging entity may then provide the network log information to a selected destination 710. The destination may be selected by a customer or may be provided by the computing resource service provider by default or as a result of various options selected by the customer, such as a type of logging or analysis to be provided to the customer. Furthermore, the logging entity may process at least a portion of the network log information before providing the network log information to the selected destination.

Figure 8:
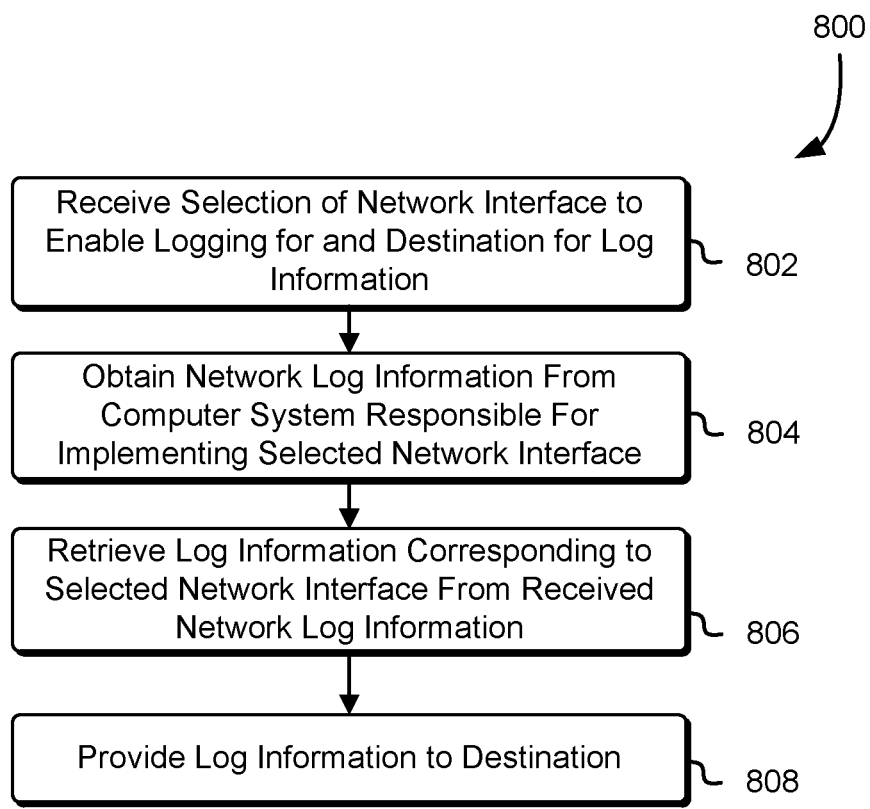
FIG. 8 is an illustrative process which may be used to provide log information corresponding to a computer system instance in a multi-tenant environment in accordance with an embodiment.

FIG. 8 shows an illustrative process 800 which may be used to provide log information corresponding to a computer system instance in a multi-tenant environment in accordance with at least one embodiment. The process 800 may be performed by any suitable system such as the firewall and logging entity described above in FIG. 6 or any combination of systems or component thereof. Returning to FIG. 8, in an embodiment, the process 800 includes receiving a selection of a network interface to enable logging and a destination for the log information 802. As described above, the customer may be using a client computing device to interact with a management console exposed to the customer. Through the management console, the customer may specify a network interface, virtual private network, subnet, computer system instance, or other computing resource provided to the customer to enable logging in.

The management console may then transmit a command to the appropriate computer system or service of the computing resource service provider to cause the computer system to obtain network log information from the computer system responsible for implementing the selected network interface 804. Obtaining the network log information may include receiving from a publishing service log information generated by the server computer system. Furthermore, the log information may include all of the log information for the plurality of customers provided resources by the server computer system in the multi-tenant environment. The log information corresponding to the selected network interface may then be retrieved from the obtained network log information 806. For example, the computing resource service provider may scan the log information for information identifying the selected network interface. The computing resource service provider may then provide the log information to a destination 808. For example, the publishing service may then transmit the log information to a metrics service which may generate visualization of the log information on behalf of the customer.

Figure 9:
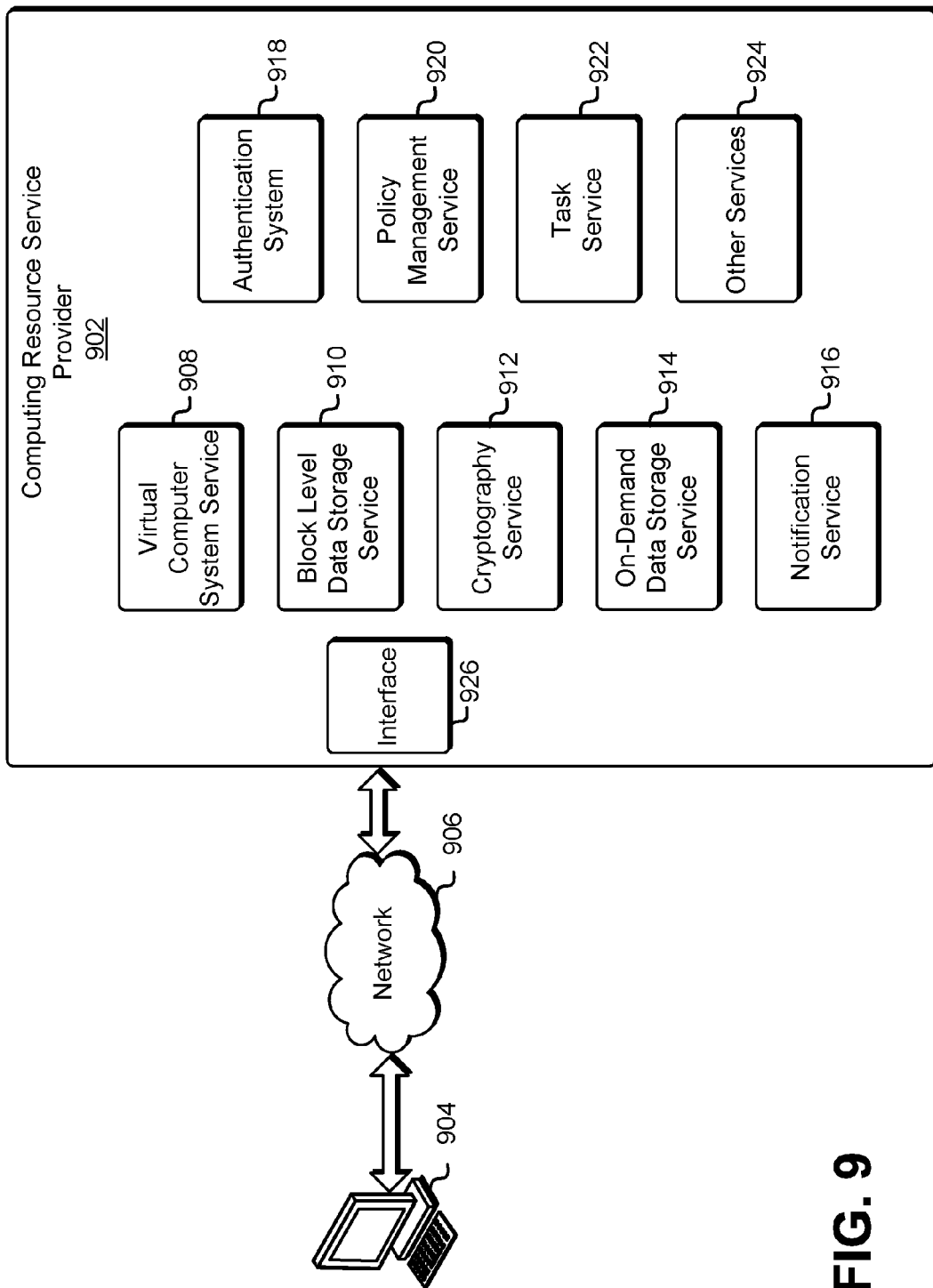
FIG. 9 illustrates an environment in which a customer is connected to a computing resource service provider.

FIG. 9 shows an example of a customer connected to a computing resource service provider in accordance with at least one embodiment. The computing resource service provider 902 may provide a variety of services to the customer 904 and the customer 904 may communicate with the computing resource service provider 902 via an interface 926, which may be a web services interface or any other type of customer interface. The interface 926 may, for instance, be configured to receive API calls from the customer 904 and, to fulfill the API calls, may cause respective services to perform various operations such as described above. Each service of the computing resource service provider 902 may be implemented as a computer system (e.g., a distributed computer system comprising multiple computing devices, each with one or more respective processors, that communicate over a network) that operates according to executable instructions stored collectively on a set of computer-readable storage media, where individual computer-readable storage media may each have a portion of the instructions for causing a respective device of the computer system to operate. In some embodiments, at least some of the services are interoperable, thereby forming a larger distributed computer system made up from individual distributed computer systems each that operates a respective service. While FIG. 9 shows one interface 926 for the services of the computing resource service provider 902, each service may have its own interface and, generally, subsets of the services may have corresponding interfaces in addition to or as an alternative to the interface 926. The customer 904 may be an organization that may utilize one or more of the services provided by the computing resource service provider 902 to maintain and deliver information to its employees, which may be located in various geographical locations. Additionally, the customer 904 may be an individual that utilizes the services of the computing resource service provider 902 to deliver content to a working group located remotely. As shown in FIG. 9, the customer 904 may communicate with the computing resource service provider 902 through a network 906, whereby the network 906 may be a communication network, such as the Internet, an intranet or an Internet service provider (ISP) network. Some communications from the customer 904 to the computing resource service provider 902 may cause the computing resource service provider 902 to operate in accordance with one or more embodiments described or a variation thereof.

The computing resource service provider 902 may provide various computing resource services to its customers. The services provided by the computing resource service provider 902, in this example, include a virtual computer system service 908, a block level data storage service 910, a cryptography service 912, an on-demand data storage service 914, a notification service 916, an authentication system 918, a policy management service 920, a task service 922 and one or more other services 924. It is noted that not all embodiments described include the services 908-924 described with reference to FIG. 9 and additional services may be provided in addition to or as an alternative to services explicitly described. As described, each of the services 908-924 may include one or more web service interfaces that enable the customer 904 to submit appropriately configured API calls to the various services through web service requests. In addition, each of the services may include one or more service interfaces that enable the services to access each other (e.g., to enable a virtual computer system of the virtual computer system service 908 to store data in or retrieve data from the on-demand data storage service 914 and/or to access one or more block level data storage devices provided by the block level data storage service 910).

The virtual computer system service 908 may include hardware, software, or combination thereof configured to instantiate virtual machine instances on behalf of the customer 904. The customer 904 may interact with the virtual computer system service 908 (via appropriately configured and authenticated API calls) to provision and operate virtual computer systems that are instantiated on physical computing devices hosted and operated by the computing resource service provider 902. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 908 is shown in FIG. 9, any other computer system or computer system service may be utilized in the computing resource service provider 902, such as a computer system or computer system service that does not employ virtualization or instantiation and instead provisions computing resources on dedicated or shared computers/servers and/or other physical devices.

The block level data storage service 910 may comprise one or more computing resources that collectively operate to store data for a customer 904 using block level storage devices (and/or virtualizations thereof). The block level storage devices of the block level data storage service 910 may, for instance, be operationally attached to virtual computer systems provided by the virtual computer system service 908 to serve as logical units (e.g., virtual drives) for the computer systems. A block level storage device may enable the persistent storage of data used/generated by a corresponding virtual computer system where the virtual computer system service 908 may only provide ephemeral data storage.

The computing resource service provider 902 also includes a cryptography service 912. The cryptography service 912 may utilize one or more storage services of the computing resource service provider 902 to store keys of the customers in encrypted form, whereby the keys may be usable to decrypt customer 904 keys accessible only to particular devices of the cryptography service 912.

The computing resource service provider 902 further includes an on-demand data storage service 914. The on-demand data storage service 914 may include hardware, software, or combination thereof configured to synchronously process requests to store and/or access data. The on-demand data storage service 914 may operate using computing resources (e.g., databases) that enable the on-demand data storage service 914 to locate and retrieve data quickly, to allow data to be provided in responses to requests for the data. For example, the on-demand data storage service 914 may maintain stored data in a manner such that, when a request for a data object is retrieved, the data object can be provided (or streaming of the data object can be initiated) in a response to the request. As noted, data stored in the on-demand data storage service 914 may be organized into data objects. The data objects may have arbitrary sizes except, perhaps, for certain constraints on size. Thus, the on-demand data storage service 914 may store numerous data objects of varying sizes. The on-demand data storage service 914 may operate as a key value store that associates data objects with identifiers of the data objects which may be used by the customer 904 to retrieve or perform other operations in connection with the data objects stored by the on-demand data storage service 914.

In the environment illustrated in FIG. 9, a notification service 916 is included. The notification service 916 may comprise hardware, software, or combination thereof configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 916 may provide notifications to clients using a "push" mechanism without the need to periodically check or "poll" for new information and updates. The notification service 916 may further be used for various purposes such as monitoring applications executing in the virtual computer system service 908, workflow systems, time-sensitive information updates, mobile applications, and many others.

As illustrated in FIG. 9, the computing resource service provider 902, in various embodiments, includes an authentication system 918 and a policy management service 920. The authentication system 918, in an embodiment, is a computer system (i.e., collection of computing resources) configured to perform operations involved in authentication of users of the customer. For instance, one of the services 908-916 and 920-924 may provide information from a user to the authentication system 918 to receive information in return that indicates whether the user requests are authentic.

The policy management service 920, in an embodiment, is a computer system configured to manage policies on behalf of customers (such as customer 904) of the computing resource service provider 902. The policy management service 920 may include an interface that enables customers to submit requests related to the management of policy. Such requests may, for instance, be requests to add, delete, change or otherwise modify policy for a customer or for other administrative actions, such as providing an inventory of existing policies and the like.

The computing resource service provider 902, in various embodiments, is also equipped with a task service 922. The task service 922 is configured to receive a task package from the customer 904 and enable executing tasks as dictated by the task package. The task service 922 may be configured to use any resource of the computing resource service provider 902, such as one or more instantiated virtual machines or virtual hosts, for executing the task. The task service 922 may configure the one or more instantiated virtual machines or virtual hosts to operate using a selected operating system and/or a selected execution application in accordance with a requirement of the customer 904.

The computing resource service provider 902 additionally maintains one or more other services 924 based at least in part on the needs of its customers 904. For instance, the computing resource service provider 902 may maintain a database service for its customers 904. A database service may hardware software, or combination thereof configured to run one or more databases for one or more customers 904. The customer 904 may operate and manage a database from the database service by utilizing appropriately configured API calls. This, in turn, may allow a customer 904 to maintain and potentially scale the operations in the database. Other services include, but are not limited to, object-level archival data storage services, services that manage and/or monitor other services.

Figure 10:
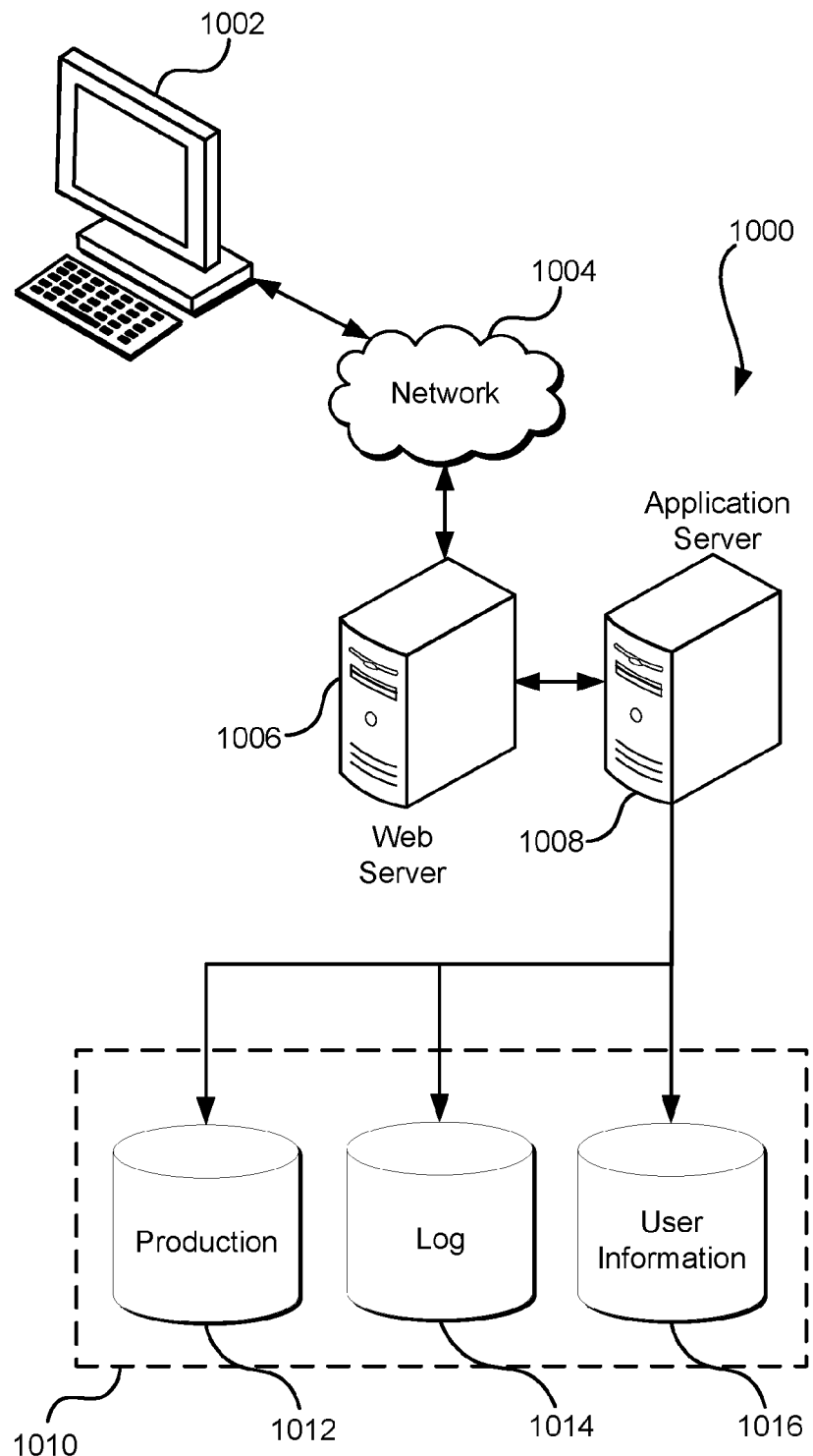
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C"

refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a request from a customer of a computing resource service provider to enable logging for a virtual computer system instance of the customer, the virtual computer system instance from one of a plurality of virtual computer system instances managed by the computing resource service provider for different customers;
   as a result of receiving the request, filtering, by a firewall, network traffic directed to the virtual computer system instance;
   obtaining a set of network traffic logs generated by filtering network traffic directed to the virtual computer system instance;
   retrieving, from the set of network traffic logs, network information associated with the virtual computer system instance, the network information including at least information indicating a source network address, a destination network address, and a firewall decision indicating whether at least a portion of the network traffic was allowed or denied according to a security policy enforced by the firewall; and
   providing the network information to a destination associated with the customer.

2. The computer-implemented method of claim 1, wherein the destination comprises a metrics service of the computing resource service provider that provides the customer associated with the virtual computer system instance with metrics information.

3. The computer-implemented method of claim 1, wherein the destination includes a metrics service indicated by the customer.

4. The computer-implemented method of claim 1, wherein the destination is at a storage service of the computing resource service provider accessible to a customer.

5. The computer-implemented method of claim 1, wherein the computer-implemented method further comprises generating a visualization of network traffic associated with the virtual computer system instance based at least in part on the network information.

6. The computer-implemented method of claim 1, wherein the destination further comprises an intrusion prevention system that updates the security policy based at least in part on the network information.

7. A system, comprising:
   one or more processors; and
   memory that stores computer-executable instructions that, if executed, cause the one or more processors to:
      receive a request from a customer of a computing resource service provider to enable logging for a virtual computer system instance supported by computing resources of the system, hosted by a computing resource service provider, and managed by the customer, where the system supports a plurality of virtual computer systems and at least a portion of the plurality of virtual computer systems are managed by other customers;
      receive one or more data packets at a network interface of the system, where the one or more data packets are associated with a set of network flows directed to the virtual computer system instance;
      filter the one or more data packets at a firewall based at least in part on one or more security policies, where the one or more security policies indicate whether to allow or deny a particular data packet based at least in part on information contained in the data packet;
      as a result of fulfillment of the received request causing logging to be enabled, obtain log information indicating a source internet protocol (IP) address, a destination IP address, and a firewall decision indicating whether data packets were allowed or denied according to the one or more security policies, the log information corresponding to the filtering of the one or more data packets and a set of actions performed by the firewall in filtering the one or more data packets; and
      provide the log information to a destination accessible to the customer.

8. The system of claim 7, wherein the destination comprises an intrusion prevention system.

9. The system of claim 8, wherein the memory further includes computer-executable instructions that, if executed, cause the one or more processors to:
   cause the intrusion prevention system to generate an update to the one or more security policies based at least in part on the log information;

obtain the update; and modify the one or more security policies based at least in part on the update.

10. The system of claim 7, wherein the destination comprises a metrics system.

11. The system of claim 10, wherein the memory further includes computer-executable instructions that, if executed, cause the one or more processors to:

cause the metrics system to generate metrics information based at least in part on the log information;

obtain the metrics information; and transmit an alarm to the customer associated with the virtual computer system instance based at least in part on the metrics information.

12. The system of claim 7, wherein the system supports an execution of a plurality of virtual computer system instances of which the virtual computer system instance is a member.

13. The system of claim 12, wherein the firewall is responsible for filtering data packets directed to the plurality of virtual computer system instances.

14. A non-transitory computer-readable storage medium having stored thereon executable instructions that, as a result of being executed by one or more processors of a computer system, cause the computer system to at least:

fulfill a request from a customer of a computing resource service provider to enable logging for a virtual computer system instance supported by computing resources hosted by a computing resource service provider, where the computing resources support a plurality of virtual computer system instances that are managed by different customers;

filter network traffic at a firewall, at least a portion of the network traffic directed to a set of computing resources used at least in part to support the virtual computer system instance managed by the customer based at least in part on one or more security policies;

as a result of enabled logging, obtain, from the firewall, network traffic log information including at least an indication of a source computing resource, a destination computing resource, and an operation to allow or deny network traffic performed based at least in part on the security policy;

retrieve, from the obtained network log information, log information corresponding to the virtual computer system instance; and provide the obtained log information to a storage service for persistent storage.

15. The non-transitory computer-readable storage medium of claim 14, wherein the instructions further comprise instructions that, as a result of being executed by the one or more processors, cause the computer system to provide the log information to the virtual computer system instance.

16. The non-transitory computer-readable storage medium of claim 14, wherein the instructions further comprise instructions that, as a result of being executed by the one or more processors, cause the computer system to generate a set of visualizations indicating one or more attributes of the network traffic based at least in part on the network traffic log information.

17. The non-transitory computer-readable storage medium of claim 14, wherein the instructions that cause the computer system to fulfill the request further include instructions that cause the computer system to obtain a command based at least in part on the customer interacting with a management console provided by the computing resource service provider.

18. The non-transitory computer-readable storage medium of claim 14, wherein the instructions further comprise instructions that, as a result of being executed by the one or more processors, cause the computer system to transmit the network traffic log information to a computing resource managed by the customer.

19. The non-transitory computer-readable storage medium of claim 14, wherein the instructions further comprise instructions that, as a result of being executed by the one or more processors, cause the computer system to:

obtain second network traffic log information from a second firewall implemented by a second computer system distinct from the computer system; and cause a metrics service to generate metrics information based at least in part on the network traffic log information and the second network traffic log information.

20. The non-transitory computer-readable storage medium of claim 19, wherein the second log information is generated by the second firewall based at least in part on network traffic directed to a second virtual computer system instance provided by the computing resource service provider, where the virtual computer system instance and the second virtual computer system instance are operated by a customer.

* * * * *